(12) United States Patent
Andrieu

(10) Patent No.: US 8,548,714 B2
(45) Date of Patent: Oct. 1, 2013

(54) METHOD FOR MAKING UNIFORM THE THRUST COMMAND OF THE ENGINES OF AN AIRCRAFT

(75) Inventor: Laurent Andrieu, Aucamville (FR)

(73) Assignee: Airbus Operations (SAS), Toulouse (FR)

( * ) Notice: Subject to any disclaimer, the term of this patent is extended or adjusted under 35 U.S.C. 154(b) by 390 days.

(21) Appl. No.: 12/725,132

(22) Filed: Mar. 16, 2010

(65) Prior Publication Data

US 2010/0241332 A1      Sep. 23, 2010

(30) Foreign Application Priority Data

Mar. 18, 2009   (FR) ..................................... 09 01261

(51) Int. Cl.
| | | |
|---|---|---|
| *G06F 19/00* | (2011.01) | |
| *G06G 7/70* | (2006.01) | |
| *B60T 7/12* | (2006.01) | |
| *G05D 1/00* | (2006.01) | |
| *G06F 7/00* | (2006.01) | |
| *G06F 17/00* | (2006.01) | |
| *F02K 1/54* | (2006.01) | |
| *B64C 13/04* | (2006.01) | |
| *F02C 9/28* | (2006.01) | |
| *B60K 28/16* | (2006.01) | |

(52) U.S. Cl.
CPC . *F02C 9/28* (2013.01); *B60K 28/16* (2013.01); *Y02T 50/671* (2013.01); *B64C 13/04* (2013.01)
USPC ........... 701/100; 701/85; 244/110 B; 244/234

(58) Field of Classification Search
None
See application file for complete search history.

(56) References Cited

U.S. PATENT DOCUMENTS

| | | | |
|---|---|---|---|
| 3,462,665 | A | 8/1969 | Espey et al. |
| 4,012,015 | A | 3/1977 | Nelson et al. |
| 2002/0091480 | A1 | 7/2002 | Greene |

FOREIGN PATENT DOCUMENTS

| | | |
|---|---|---|
| EP | 0085518 | 8/1983 |
| EP | 1158380 | 11/2001 |
| WO | WO 2007/048936 | 5/2007 |

*Primary Examiner* — Ryan Zeender
*Assistant Examiner* — H Rojas
(74) *Attorney, Agent, or Firm* — Novak Druce Connolly Bove + Quigg LLP

(57) ABSTRACT

According to this invention, artificial force gradient means (9*a*) of a throttle control lever (4) for a turbo-engine comprise means (17) for adjusting the intensity of the artificial force gradient.

3 Claims, 3 Drawing Sheets

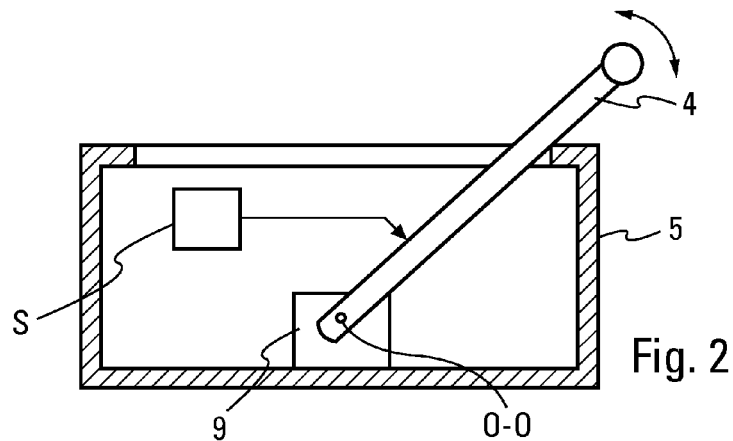
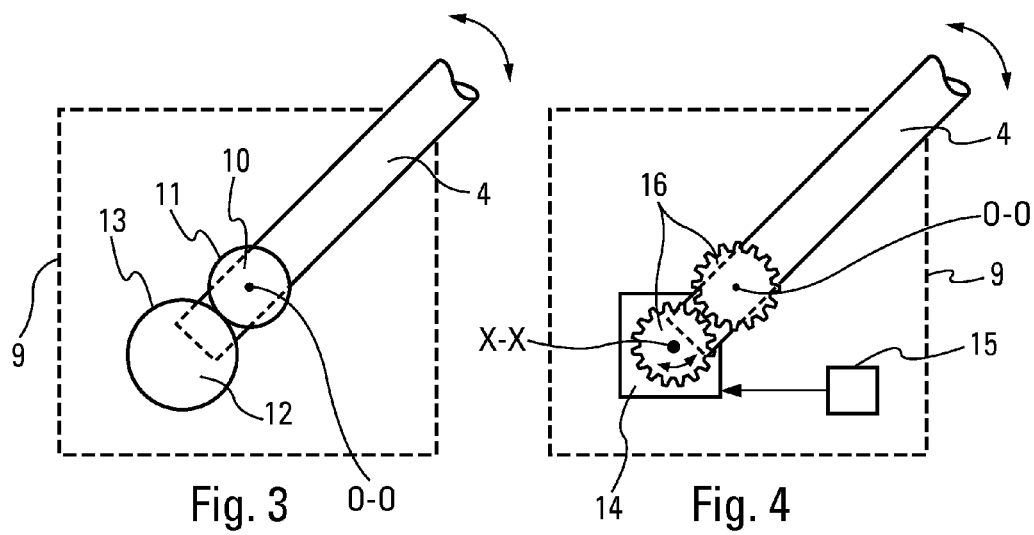
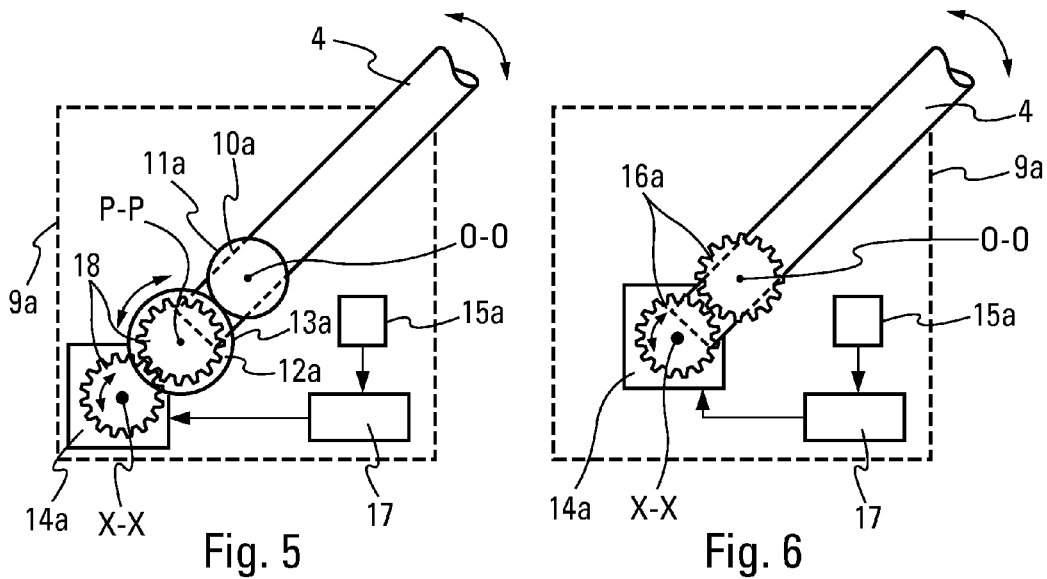

METHOD FOR MAKING UNIFORM THE THRUST COMMAND OF THE ENGINES OF AN AIRCRAFT

CROSS-REFERENCE TO RELATED APPLICATIONS

This application claims priority to French Patent Application 0901261, filed Mar. 18, 2009, the contents of which are incorporated herein by reference.

FIELD OF THE INVENTION

The present invention relates to a method for facilitating the standardization of the thrust control of the different engines of an aircraft, as well as a throttle control lever for an aircraft engine adapted for implementing such a method.

BACKGROUND OF THE INVENTION

It is known that, in a large number of aircrafts, including those used for civil transport, the engine speeds are individually controlled by throttle control levers, respectively associated with said engines. Such throttle control levers, adapted to occupy several positions, are actuated either manually by pilots, or automatically. The current position of each of such throttle levers is detected by corresponding position sensors.

It is also known that to each of said throttle control levers, there are associated permanent artificial force gradient means (more particularly under the form of an antagonistic force to the shift of the corresponding lever), either of the mechanical type or of the electromagnetic type, with an engine.

However, it frequently happens that performance deviations occur between the artificial force gradient means associated with different throttle levers of an aircraft, whatever the type (mechanical or electromagnetic) of the force gradient means being used. Such performance deviations are mainly due to control, wear, ageing effects, environmental conditions (such as temperature or humidity), etc.

Such performance deviations generally result in positioning deviations for the levers one relative to the others upon being actuated by the aircraft pilots, resulting in a dissymmetry of the thrust control for the engines of the aircraft. Upon a cruising speed flight, such a thrust dissymmetry should be compensated by flight control surfaces, being able to induce parasitic drags, being disadvantageous for the fuel consumption of the aircraft.

SUMMARY OF THE INVENTION

The aim of the present invention is to overcome such a drawback and more particularly, to standardize the thrust control for the different engines of an aircraft.

To this end, according to this invention, the method for facilitating the standardization of the thrust control for the turbo-engines of an aircraft provided with at least two turbo-engines being symmetrical with respect to the fuselage, the speeds of said turbo-engines being individually controlled by throttle control levers, respectively associated with said turbo-engines and able to occupy several positions, each one of said levers being associated with artificial force gradient means and with at least one position sensor, is characterized in that it comprises the following steps:

A/ the current position of each one of said throttle levers is determined;
B/ the mean of said current positions is calculated; and
C/ for each one of said levers:

i) the corresponding current position is compared with said calculated mean;
ii) when the deviation between said current position and said mean is at least equal to a predetermined threshold value, the intensity of the artificial force gradient produced by said force gradient means associated with said lever as a function of said deviation, is adjusted; and
iii) said current position is manually modified, via an intentional action, so as to align, at least approximately, the position of said throttle lever on said calculated mean position, said alignment being facilitated via the adjustment of the intensity of the artificial force gradient.

Thereby, according to this invention, the non-alignment is detected of at least one of the levers on the mean position of the set of levers, resulting in a dissymmetry of the thrust control for the turbo-engines of the aircraft. Upon such a non-alignment being detected, the intensity of the artificial force gradient is modified, so as to facilitate aligning the badly positioned lever on the determined mean position. Thereby, the undesirable thrust dissymmetry is deleted at the outlet of the turbo-engines of the aircraft, improving steering thereof.

Preferably, steps A/, B/ and C/ could be repeatedly performed, as long as the set of said throttle levers is not immobilized, at least approximately, in said mean position.

Advantageously, an alarm could be implemented, when the deviation between said calculated mean and the current position of at least one of said levers is at least equal to said predetermined threshold value.

Advantageously, when the deviation between the current position of one of throttle levers and said calculated mean is at least equal to said predetermined threshold, such a deviation could be displayed on display means, for informing the pilots.

Obviously, the present invention further relates to a throttle control lever of a turbo-engine of an aircraft able to occupy a plurality of positions, said lever being associated with artificial force gradient means, comprising means for adjusting the intensity of the artificial force gradient, and to at least one position sensor. According to this invention:

said force gradient means are electromagnetic and comprise at least one electric engine connected to said throttle control lever via connecting means; and
said electric engine is torque-controlled by said adjusting means.

Furthermore, the present invention also relates to a set of throttle control levers of an aircraft of the above described type. According to this invention, for each one of said throttle control levers, the corresponding adjusting means comprise:

calculation means, able to calculate the mean of the current positions of the set of throttle levers;
comparison means, able to compare said calculated mean of the current positions of the set of throttle levers and the current position of said lever and to deliver a deviation between such two positions;
control means, able to determine a control order proportional to the torque to be supplied by said electric engine associated from the current torque of said electric engine and said deviation as obtained by the comparison means; and
servo control means, able to deliver an electric signal, from said control order, for adjusting the torque of said electric engine to said torque to be delivered as determined by the control means.

Alternatively, the present invention relates to one set de throttle control levers of an aircraft, of the previously described type, and for which said corresponding turbo-engines are able to be automatically controlled by an on-board automatic pilot on said aircraft. According to this invention, for each one of said throttle control levers, the corresponding adjusting means comprise:

calculation means, able to calculate the mean of the current positions of the set of throttle levers;

comparison means able, on the one hand, to compare the current position of said lever with the calculated means of the current positions, when said corresponding turbo-engine is manually controlled, and to deliver a deviation between those two positions, and, on the other hand, to compare the current position of the lever with a desired position to be reached, as determined by said automatic pilot, when the latter is controlling said corresponding turbo-engine, and to deliver a deviation between those two positions;

control means, able to determine, on the one hand, a control order proportional to the torque to be supplied by said electric engine from the current torque of said electric engine and from said corresponding deviation as obtained by the comparison means, when said corresponding turbo-engine is manually controlled, and, on the other hand, a control order of the shift of the lever to be implemented for reaching said desired position, when said automatic pilot controls said corresponding turbo-engine; and servo control means, able to deliver an electric signal from said control order for, on the one hand, adjusting the torque of the electric engine to the torque to be supplied as determined by the control means, when said corresponding turbo-engine is manually controlled, and, on the other hand, positioning said lever in said desired position, when said automatic pilot controls said corresponding turbo-engine.

The present invention still relates to an aircraft comprising at least one throttle control lever such as above described.

In addition, the present invention further relates to an aircraft comprising at least one set of throttle control levers of the previously described type.

The figures of the appended drawing will make it obvious how this invention could be implemented. In such figures like reference numerals relate to like components.

BRIEF DESCRIPTION OF THE DRAWINGS

FIG. 2 is a schematic cross view of a throttle control lever associated with one of the turbo-engines of the airplane on FIG. 1.

FIG. 3 schematically illustrates an enlarged view of the mechanical artificial force gradient means associated with the throttle control lever of FIG. 2.

FIG. 4 is a schematic enlarged view of the electromagnetic artificial force gradient means associated with the throttle control lever illustrated on FIG. 2.

FIGS. 5 and 6 illustrate a schematic and enlarged view, respectively of two embodiments of the artificial force gradient means, in accordance to the present invention.

Figure 1:
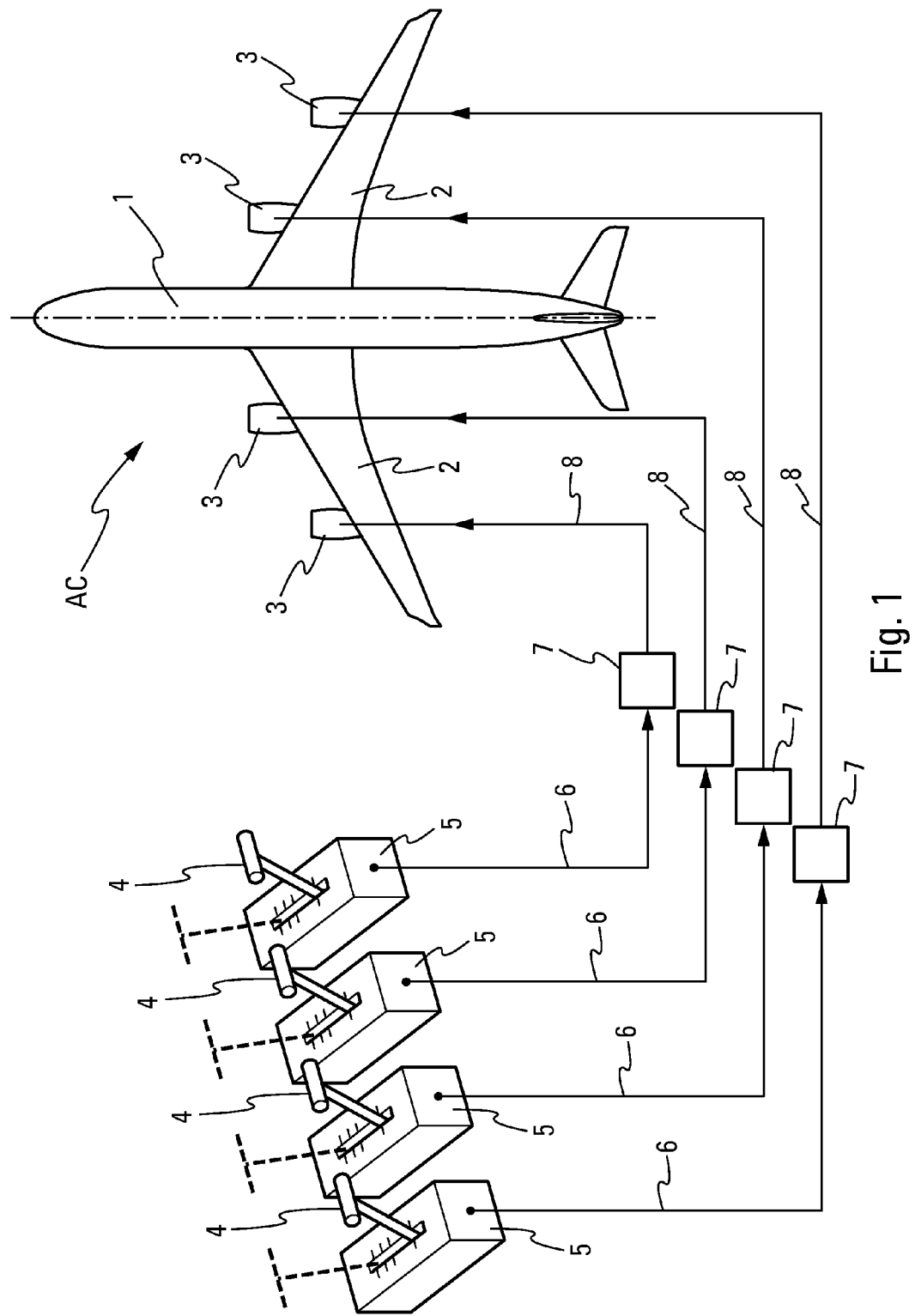
FIG. 1 schematically shows the top of a four-engined plane, as well as the set of the throttle control levers respectively associated to each one of said engines of the airplane. For clarity purposes of the drawing, such a set of levers is shown outside said airplane.

The four-engined airplane AC, as schematically shown on top of FIG. 1, comprises a fuselage 1 and two wings 2, being symmetric with respect to said fuselage 1. On each of said wings 2, there are mounted two turbo-engines 3.

DETAILED DESCRIPTION

As being schematically shown on FIG. 1, the speed of each turbo-engine 3 of the airplane AC could be controlled by means of a specific throttle control lever 4 able to occupy any position between a maximum speed position (represented in dashes) and an idle position represented in solid lines) defining the operating range of the lever 4.

On this figure, the throttle control levers 4 of the turbo-engines 3 are represented outside the airplane AC, while they are, actually, mounted on-board the cockpit thereof.

Usually, each throttle lever 4 is associated with a transducer 5 comprising position sensors S (for example, potentiometer ones or Hall effect ones) able to detect the angular position of the lever 4. The transducer 5 delivers an electric signal, being representative of the position of said lever, to a corresponding engine calculator 7 by means of the connection 6. The engine calculator 7 then sends, by means of the connection 8, a control order for the speed of the corresponding turbo-engine 3.

Such as illustrated on FIG. 2, each throttle lever 4 further comprises artificial force gradient means 9 which not only create a permanent force gradient for the pilots upon a shift of the lever 4 between its two extreme positions, but also materialize, through hard points, the characteristic positions of the throttle lever (such as idle position, taking-off, lifting, etc.) corresponding to the different flight phases of the airplane AC.

Usually, as shown on FIGS. 3 and 4, such force gradient means 9 could be:

either mechanical (FIG. 3). In such a case, they comprise, for example, a first friction disc 10, integral with said lever 4, the centre of which crosses the rotation axis O-O of the latter. The edge 11 of this first disc 10 comes into contact with the edge 13 of a second friction disc 12, stationary with respect to the transducer 5 of the lever 4, resulting in a friction upon a shifting thereof and in a stress feeling for the pilot. The mechanical force gradient means 9 could further comprise a cam/roller set (not shown on FIG. 3) able to materialize the hard points of said characteristic positions;

or electromagnetic (FIG. 4). They comprise, for instance, an electric engine 14 torque-controlled, supplied by a supplying module 15. Such an electric engine 14, with a rotor axis X-X, not only achieves the stress permanent feeling, but also materializes the hard points. As shown on FIG. 4, it is connected to the throttle lever 4 by a gearbox 16.

According to this invention, in a first embodiment illustrated on FIG. 5 (on which the elements corresponding to the force gradient means of FIG. 3 have respectively the same reference numerals, but with the index a), the mechanical force gradient means 9 of FIG. 3 are replaced by electromechanical force gradient means 9a (FIG. 5) in accordance to the present invention. The latter comprise a first friction disc 10a integral with said throttle lever 4, the centre thereof crossing the rotation axis O-O of the latter. The edge 11a of this first disc 10a comes into contact with the edge 13a of a second friction disc 12a, now mobile in rotation around an axis P-P being stationary with respect to the transducer 5, creating a friction upon a shift of the lever 4. In addition, an electric engine 14a, torque-controlled by adjusting means 17 (further described herein below), is connected to the second friction disc 12a by means of a gearbox 18. The elements 10a, 12*a* and 18 form means for connecting the electric engine 14*a* with the lever 4. Such an electric engine 14*a*, being supplied by a supplying module 15*a*, further comprises a position sensor of the rotor thereof (not shown).

Furthermore, in a second embodiment of the present invention illustrated on FIG. 6, the force gradient means 9*a* associated with each one of the throttle levers are electromagnetic. They more particularly comprise an electric engine 14*a*, torque-controlled by adjusting means 17, identical to that implemented in the first embodiment, except that it is directly connected to the corresponding throttle lever 4 by a gearbox 16*a* forming connecting means, without implementing a friction disc 10*a* or 12*a*.

Figure 7:
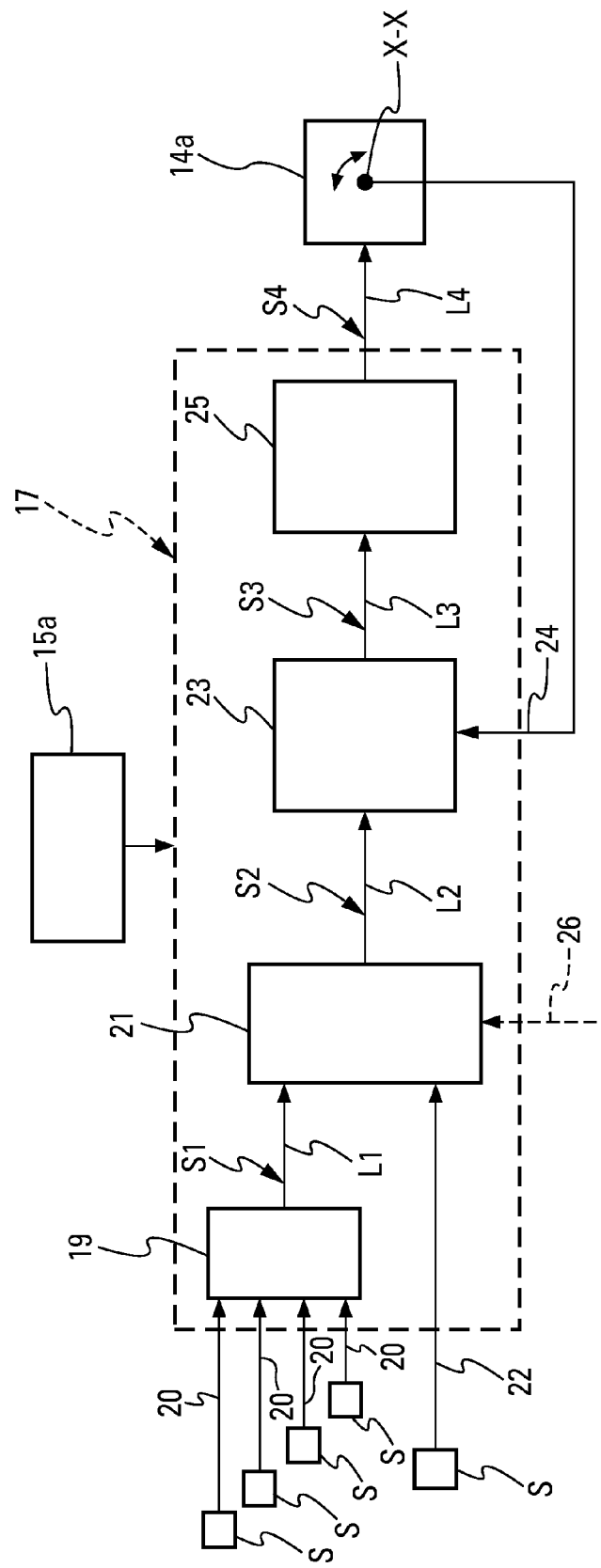
FIG. 7 is a schematic diagram of the adjusting means, associated with the artificial force gradient means of FIGS. 5 and 6, in accordance to the present invention.

As shown on FIG. 7, for each lever 4, said corresponding electric engine 14*a* being torque-controlled is controlled by adjusting means 17, in accordance to this invention, comprising:

calculation means 19, able to determine the arithmetic mean of the current angular positions of the set of throttle levers 4, from position information 20. Such calculation means 19 are able to deliver, in outlet, a signal S1 representative of said determined mean position;

comparison means 21, being connected to the calculation means 19, by means of the connection L1, and being able to receive information 22 on the current position of the throttle lever 4 being considered. Such comparison means 21 are then able to compare the mean position as calculated with the current position of said lever being considered and to deliver, in outlet, a signal S2 representative of the deviation between those two positions;

control means 23, connected to the comparison means via the connection L2. From information 24 being transmitted by the position sensor associated with said engine 14*a* and from the signal S2 coming from the comparison means 21, the control means 23 are able to deliver, in outlet, a signal S3 representative of a control order representative of the torque to be supplied by said electric engine 14*a* (still referred to as the engine equivalent torque). As an example, the torque to be delivered by said electric engine 14*a* could be proportional to said determined deviation (signal S2); and servo control means 25, connected to the control means 23 via the connection L3. From the control order S3 being received, the servo control means 25 are able to deliver, via the connection L4, an analog electric signal S4 for adjusting the torque of the electric engine 14*a*.

Thereby in the case where the current position of at least one throttle lever 4 is different from the mean position of the set of levers 4 by a deviation higher than said predetermined threshold, the pilot could correct the positioning of said badly positioned lever 4, either spontaneously, or after having been warned by visual and/or sound alarm means of the bad positioning of said lever. Upon this correction of the positioning, the adjusting means 17 associated to this badly positioned lever 4 adjust the stress feeling created by the corresponding force gradient means 9*a*.

Moreover, when at least one of said throttle levers is badly positioned, it could further be contemplated:

to display the deviation as determined by the comparison means 19 on display means (not shown on the figures), so as to notify the pilots of the airplane;

to deactivate the artificial force gradient means 9*a* by some predetermined time period (for instance a few seconds) after the set of levers has been immobilized;

to automatically reposition the badly positioned lever 4 by means of the electric engine 14*a*.

In an alternative of the second embodiment, when the speed of the turbo-engines of the airplane AC is automatically controlled by an on-board automatic pilot (not shown), the shift of each one of the throttle levers 4 for reaching a position as determined by this automatic pilot is carried out by the electric engine 14*a* belonging to the corresponding electromagnetic force gradient means 9*a*.

Contrarily, when the speed of the turbo-engines is manually controlled by the crew, the electromagnetic force gradient means 9*a* are implemented so as to create an artificial feeling of stress for the pilot, such as previously described.

Thus according to said alternative, when the speed of the turbo-engines 3 is controlled by the automatic pilot, for each one of said levers 4:

the comparison means 21 of the corresponding adjusting means 17 are able to receive information 26 (represented by the dash line arrow 26) on a desired position to be reached, as determined by the automatic pilot. From such information 26 and information 22 on the current position of the lever 4 to be considered, the comparison means 21 are able to deliver, in outlet, the signal S2 representative of the deviation between those two positions;

from the signal S2 and information 24, the control means 23 are able to deliver, in outlet, the signal S3 representative of a control order of the shift of the lever 4 for reaching said desired position; and from the signal S3, the servo control means 25 are able to deliver the analog electric signal S4 for controlling the electric engine 14*a* of the force gradient means 9*a* associated with said lever 4.

On the other hand, when the speed of the turbo-engines is manually controlled by the pilots, the operation of the adjusting means 17 is identical to that previously described with respect to the first embodiment and the second embodiment.

The invention claimed is:

1. A method for facilitating the standardization of a thrust control for a plurality of turbo-engines (3) of an aircraft (AC) provided with at least two turbo-engines (3) being symmetrical compared to the fuselage (1), speeds of said turbo-engines (3) being individually controlled by throttle control levers (4), respectively associated with said turbo-engines (3) and able to occupy several positions, each one of said levers (4) being associated with artificial force gradient means and with at least one position sensor (S), comprising:

A/ a current position of each one of said throttle levers is determined by the at least one position sensor (S);

B/ a mean of said current positions is calculated by a calculating means (19) and C/ for each one of said levers (4):
  i) a corresponding current position is compared with said calculated mean, by a comparison means (21);
  ii) when the deviation between said current position and said mean is at least equal to a predetermined threshold value, the intensity of the artificial force gradient produced by said force gradient means (9*a*) associated with said lever (4) as a function of said deviation, is adjusted by servo control means (25); and
  iii) said corresponding current position is manually modified, via an intentional action, so as to align, at least approximately, a position of said throttle lever (4) on said calculated mean position, said alignment being facilitated via an adjustment of the intensity of an artificial force gradient by said servo control means (25).

2. A method according to claim 1, wherein steps A/, B/ and C/ are repeatedly performed, as long as the set of said throttle levers (4) is not immobilized, at least approximately, in said mean position.

3. A method according to claim 1, wherein an alarm is implemented, when the deviation between said calculated mean and the current position of at least one of said levers (4) is at least equal to said predetermined threshold value.

* * * * *